Figure 1:
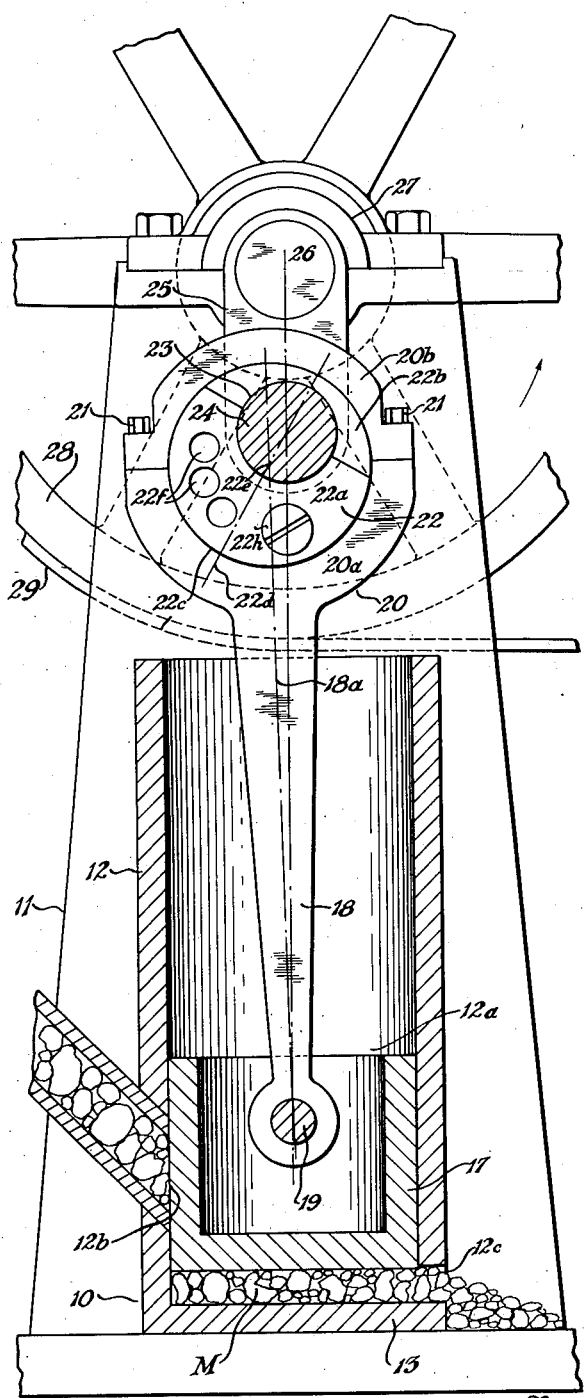

Aug. 29, 1933.  R. W. RIDER  1,924,516
MEANS FOR CONVERTING MOTION AND THE LIKE
Original Filed May 29, 1929

Inventor
Rowland W. Rider
Attorneys

Patented Aug. 29, 1933

1,924,516

UNITED STATES PATENT OFFICE 1,924,516

MEANS FOR CONVERTING MOTION AND THE LIKE

Rowland W. Rider, Salt Lake City, Utah, assignor to Utah Royalty Corporation, Salt Lake City, Utah, a corporation of Utah Continuation of application Serial No. 316,973, May 29, 1929. This application July 8, 1930. Serial No. 466,599

3 Claims. (Cl. 74—38)

My invention relates to means or mechanisms for converting motion in one predetermined path to motion in another predetermined path, and the like, and is a continuation of my prior application for patent filed May 29, 1929, Serial No. 366,973.

Means and mechanisms for converting motion in one predetermined path to motion in another predetermined path, may include one member constrained to move in a predetermined path which may be, for example, a crank pin mounted upon the end of a crank which is secured for rotation on a suitably journalled shaft, and the crank pin thus being movable in a predetermine circular path by rotation of the crank.

The crank pin, for example, may be pivotally connected to one end of a connecting rod, and the other end of the connecting rod may be pivotally connected to another member which is constrained to move in another predetermined path, as for example, a rectilinearly reciprocating member which may be a piston or hammer member slidable back and forth in a cylinder guide member.

On the other hand, the other member may be a crank pin secured at the outer end of an oscillating lever arm mounted on a suitably journalled shaft, and the lever arm crank pin being pivotally connected to the connecting rod.

Either one of the members constrained to move in their respective predetermined paths may be a drive member, in which case the other member becomes a driven member.

In an internal combustion engine, for example, a rectilinearly reciprocating piston is connected by its connecting rod to a crank, which is rotated by the rectilinear movement applied to the piston by the expanding gases in the cylinder.

On the other hand, in the case of a hammer, power may be applied to the rotating crank which then becomes a driving member, and the reciprocating member becomes a driven member whose energy may be utilized for hammering, tamping, ramming, or crushing and the like.

In either case, due to the instantaneous change in direction of the motion of the reciprocating or oscillating member, at the end of each stroke thereof, and to the change in the velocity thereof from a maximum at the middle point of each stroke to zero at the end thereof, as ordinarily constructed, the other member of such a mechanism which may be, for example, the rotating crank and crank pin, as aforesaid, is subject to excessive stresses caused, first, by the necessity of absorbing the inertia forces of the reciprocating or oscillating member, and second, by the absorption of any forces externally applied thereto, as for example, the impact force applied to the piston of a hammer or crusher when it strikes the object being worked on, or in the case of an internal combustion engine, the maximum compression resistance, and the explosive force of the burning gases.

The objects of the present improvements include the provision of novel means including novel cushioning members for converting motion and the like, and adapted to overcome the foregoing and other objectionable features of the usual uncushioned means for converting motion.

The present invention includes the use of a cushioning member rotatably mounted preferably for free rotation on one of the members constrained to move in a predetermined path and preferably upon the rotating member, and the end of the connecting rod adjacent the rotating member being pivotally connected with the cushioning member instead of being connected directly to the rotating member.

The present invention further includes particular relationships between the dimensions of all the parts of the mechanism, and of the masses of the moving parts thereof, and between such elements and the maximum inertia and resisting forces set up in or applied to the reciprocating or oscillating member.

The present invention further includes the provision of means for normally maintaining the cushioning member at any desired position relative to other parts of the apparatus, for obtaining improved operation of the apparatus.

By the use of the present invention, for example, it has been found possible to construct crushers and the like which may be directly driven by electric motors and the like, of relatively small horse power.

The foregoing and other objects are attained by the apparatus, parts, improvements, and combinations, which comprise the present invention, and which are particularly and distinctly pointed out and set forth in the appended claims forming part hereof.

Figure 2:
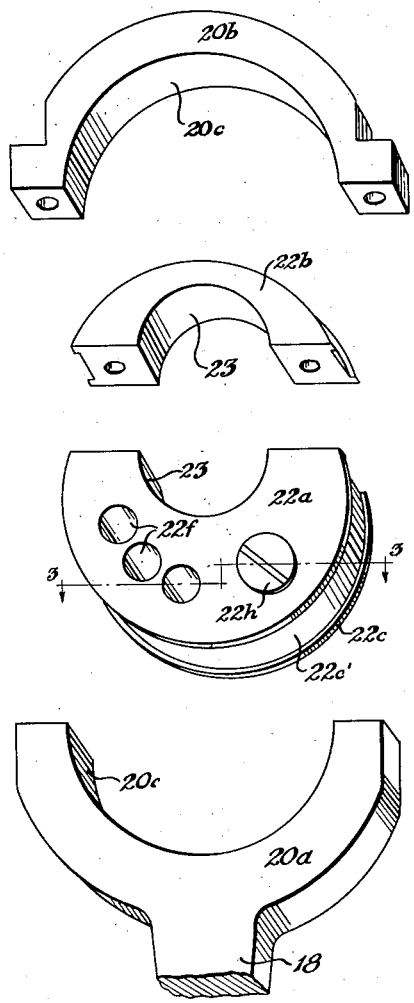
Figure 3:
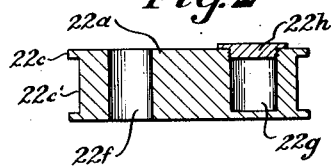

A preferred embodiment of the invention is illustrated in the accompanying drawing forming part hereof, in which Figure 1 is a fragmentary view illustrating a crusher including the present improvements;

Fig. 2, a separated view of the eccentric cushioning member and enclosing member of the crusher illustrated in Fig. 1; and Fig. 3, a sectional view of the cushioning member thereof as on line 3—3, Fig. 2.

Similar numerals refer to similar parts throughout the drawing.

A crusher embodying the present improvements is indicated generally at 10, and includes a frame 11 at the lower end of which an upwardly opening cylinder 12 is mounted.

The cylinder 12 is closed at its lower end by a crushing head 13 upon which material M to be crushed is placed, and the material M may be introduced into the crushing chamber 12a as through an inlet aperture 12b formed in the wall of the cylinder 12, and the crushed material flows from the crushing chamber through an outlet aperture 12c formed in the cylinder 12.

Rectilinear motion of the hammer 17 is imparted through a connecting rod 18, the lower end of which is pivotally secured to the hammer 17, as by means of a wrist pin 19, and the upper end of the connecting rod 18 is connected with an enclosing member indicated generally at 20 and which as illustrated includes one semicircular portion 20a and another semi-circular portion 20b, the ends of which are secured to each other as by means of screws 21.

The enclosing member 20 may be however made of one piece.

Within the enclosing member 20 is rotatably mounted a circular eccentric cushioning member indicated generally by 22.

The cushioning member 22 as illustrated is formed by a larger segmental portion 22a and a smaller segmental portion 22b, which are secured together by suitable screws, but the cushioning member 22 may be formed of one piece of material.

The outer cylindric face 22c of the cushioning member has preferably formed therein a peripheral groove 22c' within which the inner cylindric face 20c of the enclosing member rotatably fits.

Preferably between the portions 22a and 22b of the cushioning member, a cylindric crank pin bearing 23 is formed, within which a crank pin 24 is mounted for free rotation.

The crank pin 24 is mounted upon the outer end of a crank 25, and the crank 25 is secured for rotation on a shaft 26.

The shaft 26 is journalled in a bearing block 27, and the bearing block 27 is carried at the upper end of the frame 11.

A power in-put fly wheel 28 is secured to the shaft 26 and power may be delivered thereto as by means of a belt 29, which is driven by any suitable motor.

The normal operating speed of the crank shaft 26 is such as to set up centrifugal forces in the cushioning member 20 sufficient to normally maintain the heavier portion of the cushioning member on the outside of the path of movement of the crank pin 24.

Accordingly when the crushing chamber 12a is filled to its maximum capacity, and the fly wheel 28 is driven by the belt 29, the stroke of the crushing hammer 17 increases with each revolution of the crank 25 until the maximum stroke indicated in Fig. 1 has been attained, at which time the material M has been crushed to the desired degree of fineness.

After filling the crushing chamber 12a with the material M to be crushed, the stroke of the crushing hammer 17 thus automatically increases as aforesaid without any change whatever in the speed of the drive motor.

In order to improve the crushing operation and to maintain crushing contact with the material for a prolonged period of time, means are provided for displacing the center of gravity of the cushioning member from the median line 22d thereof, on which the geometrical center 22e of the cushioning member is located.

The longitudinal center line 18a of the connecting rod 18 always passes through the geometrical center 22e of the cushioning member.

The center of gravity of the cushioning member may be displaced as aforesaid, as by forming a plurality of apertures 22f at one side of the median line 22d, and/or by weighting the cushioning member 22 at the other side of the median line 22d, as by means of mercury inserted in a socket 22g formed in the heavier portion 22a of the cushioning member, and the socket 22g being provided with a screw closure 22h for retaining the mercury therein.

Accordingly the center of gravity of the cushioning member may be thus located on a line passing through the axis of the socket 22g and the axis of the crank pin 24, and means are thus provided which maintain the median line 22d of the cushioning member 22 out of line with the line of movement of the reciprocating crusher hammer 17, or in other words the eccentric cushioning member is maintained at a predetermined position relative to the inclosing member 20, whose center always coincides with the geometrical center of the cushioning member.

It is to be noted that the center of gravity of the cushioning member is displaced from the cylinder axis through the geometrical center of the cylindric enclosing member and from the median line of the cushioning member.

The longitudinal axis of the connecting rod extends through the geometrical center of the enclosing member and the cushioning member; and consequently by reason of the aforesaid displacement of the center of gravity of the cushioning member, there is always a tendency for the cushioning member to rotate within the enclosing member, during operation of the crusher 10.

Such rotation occurs to obtain the aforesaid new and beneficial results at the time of crushing impact in the crusher 10.

I claim:—

1. Means for connecting a rotary member having a wrist pin thereon with a reciprocating member, the connecting means including an eccentric freely rotatable on the wrist pin of the rotary member, a member enclosing the eccentric and connected to the reciprocating member, the eccentric and enclosing member being adapted to rotate relative to each other, and positioning means between the eccentric and enclosing member comprising a mass on the eccentric adapted to maintain them normally in such positions relative to each other that a line drawn through the centre of the eccentric and the centre of the wrist pin will be in a predetermined angular relation to the centre line of the reciprocating member.

2. Means for connecting a rotary member having a wrist pin thereon with a reciprocating member, the connecting means including an eccentric freely rotatable on the wrist pin of the rotary member, and the eccentric having a peripheral groove formed therein, a member enclosing the eccentric and extending into said groove and connected to the reciprocating member, the eccentric and enclosing member being adapted to rotate relative to each other, and means adapted to maintain the eccentric and enclosing members normally in such positions relative to each other that a line drawn through the centre of the eccentric and the centre of the wrist pin will be normally in a predetermined angular relation to the centre line of the reciprocating member.

3. Means for connecting a rotary member having a wrist pin thereon with a reciprocating element, the connecting means including an eccentric freely rotatable on the wrist pin of the rotary member, a member enclosing the eccentric and connected to the reciprocating element, the eccentric and enclosing member being free to rotate relative to each other and a mass on the eccentric on one side of a line drawn through the centre of the eccentric and the centre of the wrist pin so that said line will be normally out of line with the line of movement of the reciprocating member.

ROWLAND W. RIDER.